(12) United States Patent
Lau

(10) Patent No.: US 8,410,645 B2
(45) Date of Patent: Apr. 2, 2013

(54) POWER TOOL

(75) Inventor: James Ching Sik Lau, Hong Kong (CN)

(73) Assignee: Johnson Electric S.A., Murten (CH)

( * ) Notice: Subject to any disclaimer, the term of this patent is extended or adjusted under 35 U.S.C. 154(b) by 286 days.

(21) Appl. No.: 12/832,553

(22) Filed: Jul. 8, 2010

(65) Prior Publication Data

US 2011/0006621 A1 Jan. 13, 2011

(30) Foreign Application Priority Data

Jul. 8, 2009 (CN) .......................... 2009 2 0133578

(51) Int. Cl.
*H02K 7/14* (2006.01)
*H02K 1/32* (2006.01)

(52) U.S. Cl. ................ 310/50; 310/64; 310/62; 310/63; 173/217

(58) Field of Classification Search ............ 310/50, 310/64, 62, 63; 173/217
See application file for complete search history.

(56) References Cited

U.S. PATENT DOCUMENTS

| | | | |
|---|---|---|---|
| 4,322,646 A * | 3/1982 | Persson | 310/64 |
| D325,560 S | 4/1992 | Baines | |
| 5,877,576 A * | 3/1999 | CoChimin | 310/418 |
| 5,925,947 A * | 7/1999 | Kajiwara et al. | 310/64 |
| 6,050,786 A * | 4/2000 | Lin | 417/366 |
| 6,111,235 A * | 8/2000 | Ritter et al. | 219/619 |
| 6,145,585 A * | 11/2000 | Wei | 165/80.2 |
| 6,455,186 B1 * | 9/2002 | Moores et al. | 429/71 |
| 6,729,414 B2 * | 5/2004 | Cooper et al. | 173/217 |
| 7,157,818 B2 * | 1/2007 | Jones | 310/63 |
| 7,166,939 B2 * | 1/2007 | Voigt et al. | 310/47 |
| 7,323,796 B2 * | 1/2008 | Oomori et al. | 310/50 |
| 8,039,999 B2 * | 10/2011 | Chen | 310/47 |
| 2003/0184172 A1 | 10/2003 | Ghiotto | |
| 2004/0104636 A1 * | 6/2004 | Ortt et al. | 310/154.08 |
| 2004/0263008 A1 * | 12/2004 | Voigt et al. | 310/58 |
| 2005/0236917 A1 | 10/2005 | Lui | |
| 2005/0269884 A1 * | 12/2005 | Teranishi et al. | 310/50 |
| 2006/0012254 A1 * | 1/2006 | Einheuser et al. | 310/58 |
| 2006/0013712 A1 * | 1/2006 | Lee et al. | 417/423.7 |
| 2006/0066160 A1 * | 3/2006 | Ikuta et al. | 310/63 |
| 2006/0087752 A1 * | 4/2006 | Park et al. | 359/824 |
| 2006/0261686 A1 * | 11/2006 | Rutsyamuka | 310/53 |
| 2006/0284511 A1 * | 12/2006 | Evon et al. | 310/216 |
| 2007/0057588 A1 * | 3/2007 | Hyodo et al. | 310/154.07 |
| 2007/0075595 A1 | 4/2007 | Naraysnan et al. | |

(Continued)

FOREIGN PATENT DOCUMENTS

CN 194593 4/2007
DE 102009015422 A1 * 10/2009

(Continued)

*Primary Examiner* — Tran N. Nguyen
*Assistant Examiner* — Alex W Mok
(74) *Attorney, Agent, or Firm* — Muncy, Geissler, Olds & Lowe, PLLC

(57) ABSTRACT

A power tool has a casing and a motor assembly installed in the casing. The motor assembly comprises a motor and a heat dissipation device. The motor comprises a housing and magnets or windings disposed at an inner surface of the housing. The heat dissipation device is arranged at an outer surface of the housing and a window is formed in the casing to expose the heat dissipation device. Preferably, the heat dissipation device comprises an annular heat absorbing section fitted to a radially outer surface of the motor housing and a plurality of fins extending from the heat absorbing section and into the window.

10 Claims, 4 Drawing Sheets

U.S. PATENT DOCUMENTS

| | | | |
|---|---|---|---|
| 2007/0182269 A1* | 8/2007 | Takahashi et al. | 310/217 |
| 2008/0007916 A1 | 1/2008 | Hogg et al. | |
| 2008/0122322 A1* | 5/2008 | Izumi | 310/67 R |
| 2008/0231126 A1* | 9/2008 | Telore et al. | 310/59 |
| 2008/0290745 A1* | 11/2008 | Riedl | 310/50 |
| 2008/0309172 A1* | 12/2008 | Tseng | 310/50 |
| 2009/0015079 A1* | 1/2009 | Riedl et al. | 310/50 |
| 2009/0079279 A1 | 3/2009 | Cheng et al. | |
| 2009/0096300 A1* | 4/2009 | Oyoung et al. | 310/54 |
| 2009/0121564 A1 | 5/2009 | Pal et al. | |
| 2009/0127946 A1* | 5/2009 | Fee et al. | 310/64 |
| 2009/0145621 A1* | 6/2009 | Lau et al. | 173/217 |
| 2009/0200878 A1* | 8/2009 | Walter | 310/50 |

FOREIGN PATENT DOCUMENTS

| | | |
|---|---|---|
| EP | 0001222 A1 | 4/1979 |
| EP | 069776 A1 | 2/1996 |
| GB | 2209878 A | 5/1959 |
| JP | 2001251815 | 9/2001 |
| JP | 2009137011 A * | 6/2009 |

* cited by examiner

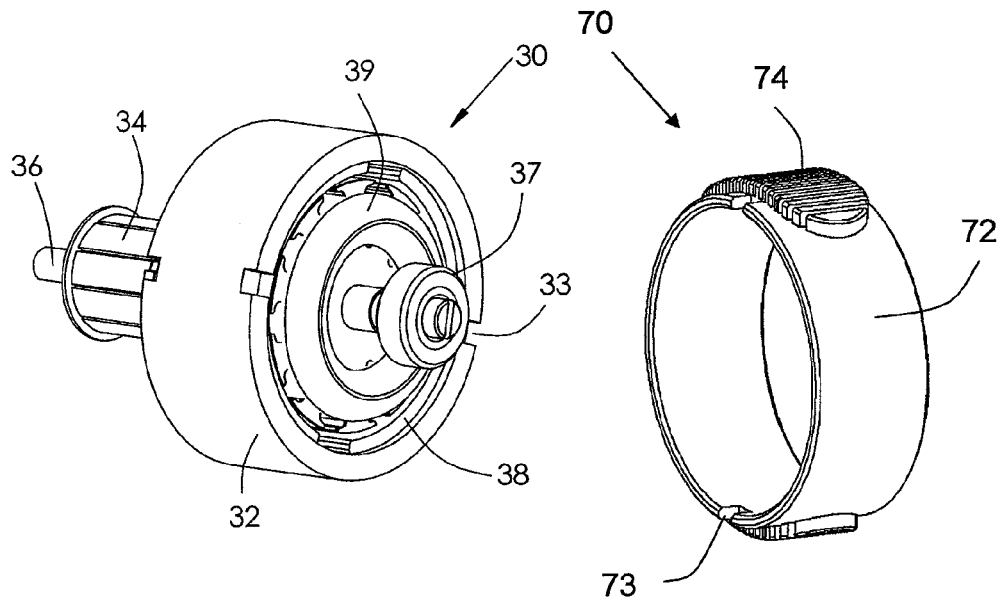
FIG. 3
FIG. 4
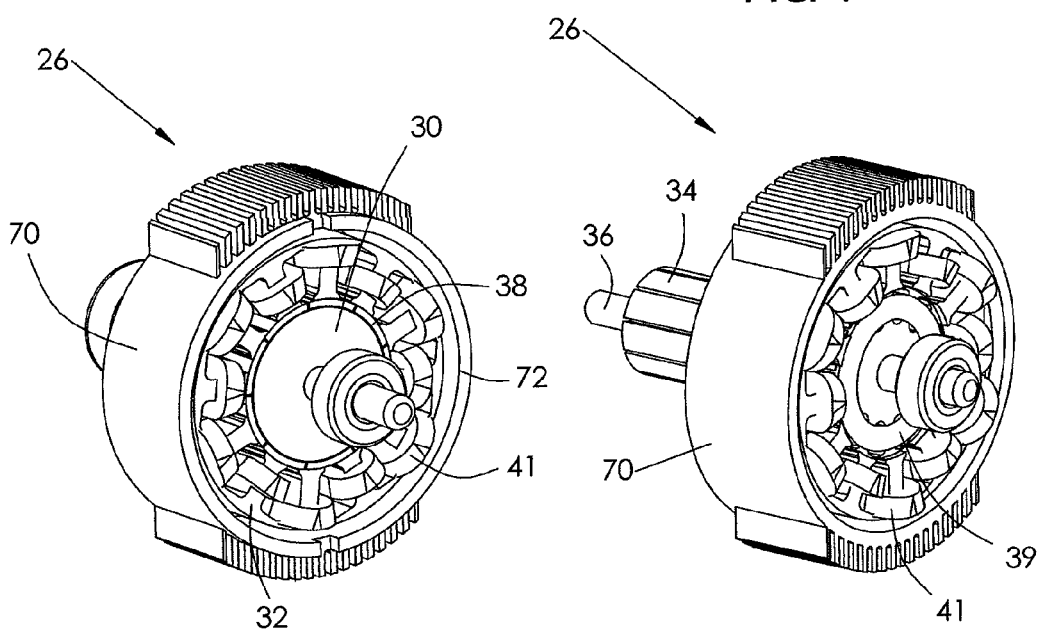
FIG. 5
FIG. 6

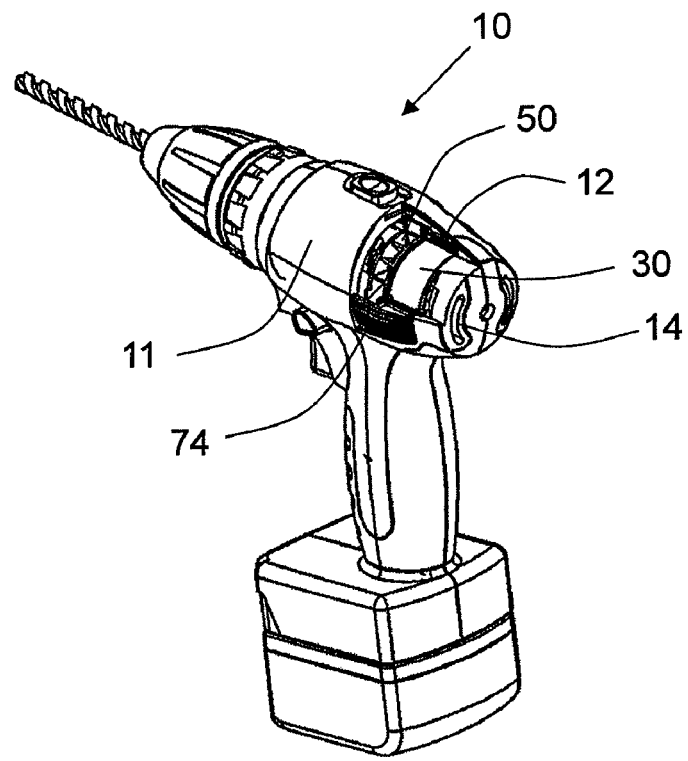
FIG. 10
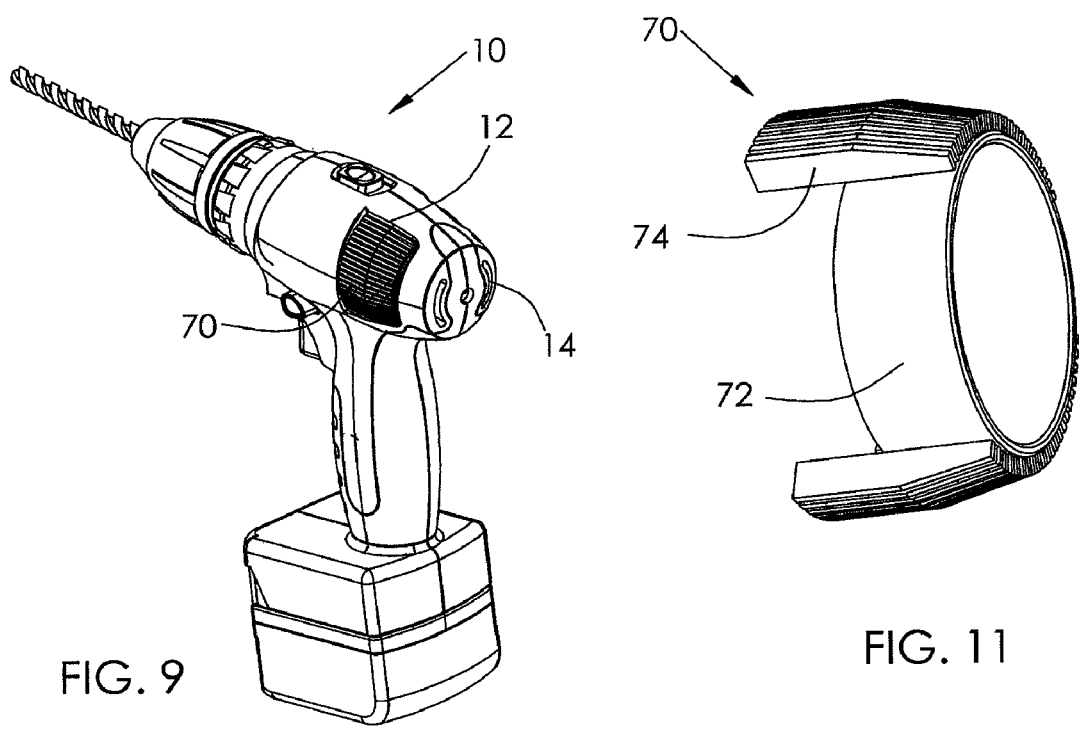
FIG. 9
FIG. 11

POWER TOOL

CROSS REFERENCE TO RELATED APPLICATIONS

This non-provisional patent application claims priority under 35 U.S.C. §119(a) from Patent Application No. 200920133578.9 filed in The People's Republic of China on Jul. 8, 2009.

FIELD OF THE INVENTION

This invention relates to a power tool and in particular to a power tool with improved cooling.

BACKGROUND OF THE INVENTION

Power tools such as drills are widely used. A power tool generally comprises a motor and a speed reduction gear box. The motor's output speed is reduced by the gear box, while the motor's output torque is increased. A lot of heat is generated during high load operation of the motor, which will affect the performance of the motor if the heat is not dissipated in time.

Hence there is a desire for a power tool with improved cooling of the motor.

SUMMARY OF THE INVENTION

Accordingly, in one aspect thereof, the present invention provides a power tool comprising a casing and a motor assembly installed in the casing, the motor assembly comprising a motor and a heat dissipation device, the motor comprising a housing and magnets or windings disposed at an inner surface of the housing, wherein the heat dissipation device is arranged at an outer surface of the housing, and a window is formed in the casing to expose the heat dissipation device.

Preferably, the heat dissipation device comprises a heat absorbing section and a plurality of fins extending from the heat absorbing section, the heat absorbing section being fixed to the outer surface of the housing.

Preferably, the heat absorbing section is ring-shaped and is fitted around and in contact with a radially outer surface of the housing.

Preferably, the fins are disposed along a part of a radially outer surface of the ring-shaped heat absorbing section, and two windows are formed in the casing to expose the fins.

Preferably, the fins are arranged along the whole of a radially outer surface of the ring-shaped heat absorbing section, and the window in the casing is part annular.

Preferably, the housing is a stator housing of the motor.

Preferably, the motor is a permanent magnet motor comprising permanent magnets made of a heat conductive material fixed to an inner surface of the housing, and heat generated by rotor windings is transferred to the magnets by way of heat radiation and transferred to the housing from the magnets by way of heat conduction.

Alternatively, the motor may be a brushless motor or universal motor, comprising field windings arranged inside the housing.

Preferably, the tool further comprises a fan and the casing comprises an air inlet, airflow generated by the fan entering into the casing through the air inlet and flowing out of the casing through the window where the fins are exposed.

Preferably, the fan is a centrifugal fan and an outlet of the fan is surrounded by portions of the fins that extend axially from the heat absorbing section.

BRIEF DESCRIPTION OF THE DRAWINGS

Preferred embodiment of the invention will now be described, by way of example only, with reference to figures of the accompanying drawings. In the figures, identical structures, elements or parts that appear in more than one figure are generally labeled with a same reference numeral in all the figures in which they appear. Dimensions of components and features shown in the figures are generally chosen for convenience and clarity of presentation and are not necessarily shown to scale. The figures are listed below.

FIG. 3 illustrates the motor assembly of FIG. 2 with the heat dissipation device removed;

FIG. 4 illustrates a heat dissipation device similar to the heat dissipation device of the motor assembly of FIG. 2;

FIG. 5 illustrates a motor assembly according to another embodiment of the present invention;

FIG. 6 illustrates a motor assembly according to a further embodiment of the present invention;

FIG. 9 illustrates a power tool according to another embodiment of the present invention;

FIG. 10 illustrates the power tool of FIG. 9 with a portion cut away to reveal the motor and a fan; and FIG. 11 illustrate a heat dissipation device of the power tool of FIG. 9.

DETAILED DESCRIPTION OF THE PREFERRED EMBODIMENTS

The preferred embodiment of the present invention will be described with reference to FIGS. 1 to 3. It should be understood that the power tool according to the present invention can be a power drill, power hammer, electric saw, electric wrench, etc. A portable, battery operated, power drill will be used hereafter to describe the invention by way of example only.

Figure 1:
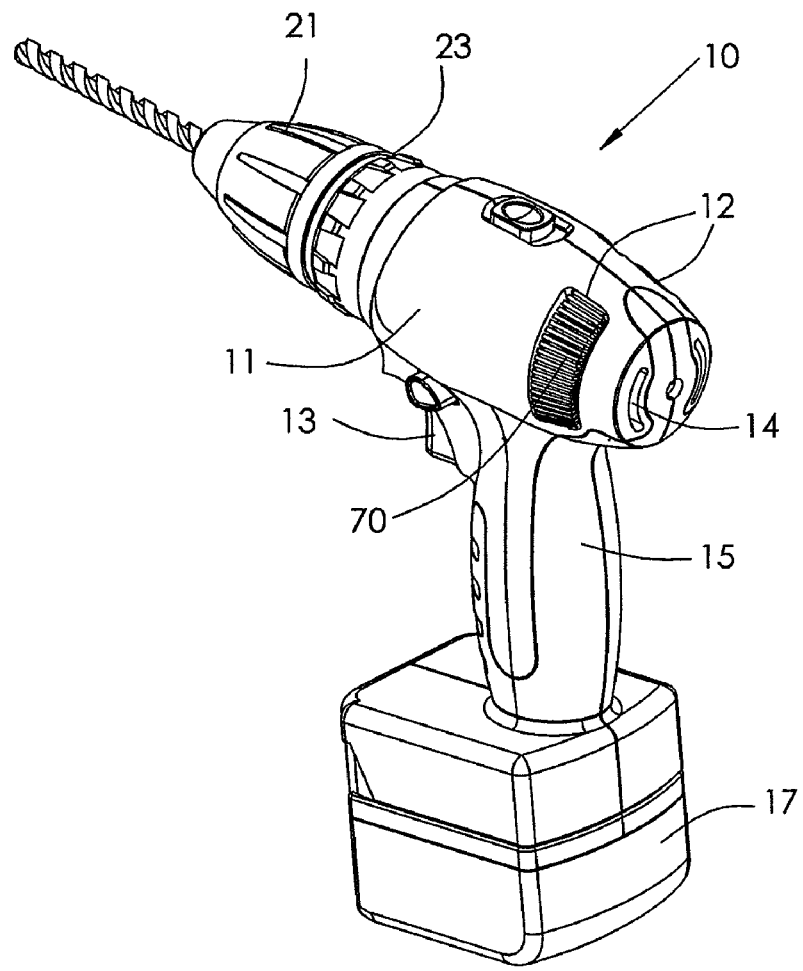
FIG. 1 illustrates a power tool according to the preferred embodiment of the present invention.
Figure 2:
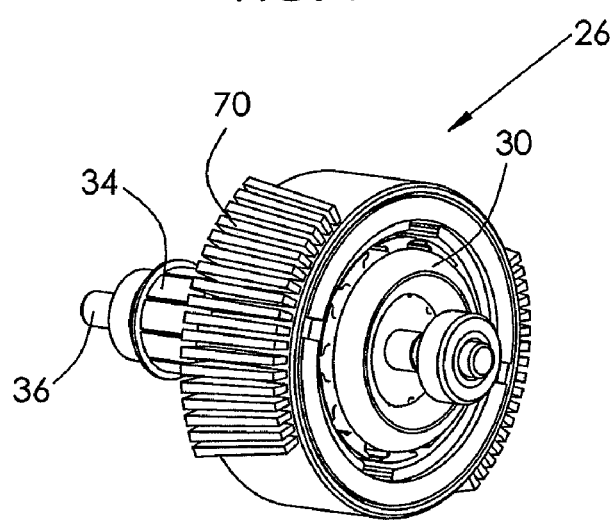
FIG. 2 illustrates a motor assembly of the power tool of FIG. 1.

A power tool 10 according to the preferred embodiment of the present invention, as shown in FIGS. 1 to 3, comprises a casing 11 and a motor assembly 26 disposed within the casing. The casing 11 defines an inlet 12 and an outlet 14 for the flow of air through the casing to cool the motor. The power tool, being a portable drill, also has a chuck 21 for holding drill bits and a torque control mechanism 23. Operation of the tool is manually controlled by pressing a switch 13 located on a handle 15 of the casing. A battery pack 17 is connected to a lower end of the handle for supplying power to the motor via the switch.

The motor assembly 26 comprises a motor 30 and a heat dissipation device 70. The motor has a housing 32 forming a part of the stator of the motor and a rotor. The rotor includes a shaft 36 and a rotor core and a commutator 34 fixed to the shaft. A bearing 37 is shown to illustrate that the rotor is rotatably supported, preferably through bearings supported by bearing brackets (not shown) fixed to the stator. The heat dissipation device 70 preferably comprises an annular heat absorbing section 72 and a plurality of fins 74 arranged at the radially outer surface of the heat absorbing section for dissipating heat. The heat absorbing section 72 is fitted to the radially outer surface of the housing 32. Thermally conductive adhesive may be used to fix the heat absorbing section 72 to the motor housing and to fill any spaces between the housing 32 and the heat absorbing section 72 to improve the heat transfer. Small cutouts 73 are formed at both axial ends of the heat absorbing section 72, and small cutouts 33 are formed at both axial ends of the housing 32 of the motor 30. The small cutouts 73 as well as cutouts 33 engage ribs on the inner surface of the casing 11 of the power drill, so as to limit axial and circumferential movement of the motor 30/heat dissipation device 70.

Motor 30 can be a commutator motor such as PMDC motor having, permanent magnets 38 fixed to an inner surface of the housing, rotor windings 39 and a commutator 34, as shown in FIG. 3. Alternatively, motor 30 may be a brushless motor, with salient poles with stator windings 41 arranged inside the housing 32, and magnets 38 fixed to the rotor, as shown in FIG. 5. Furthermore, motor 30 may be a universal motor, having stator windings 41 wound about salient poles arranged inside the housing 32, and rotor windings 39 wound on the rotor, as shown in FIG. 6.

Preferably, heat dissipation device 70 is made of aluminum. However, it is apparent that heat dissipation device 70 can be made of any other suitable heat conductive material. Fins 74 of heat dissipation device 70 are arranged on a part of the outer surface of the annular heat absorbing section 72. In FIG. 3, the fins 74 are arranged on two diametrically opposite surface portions of the heat absorbing section 72. Casing 11 of the power drill comprises two windows 12 to expose the fins 74. Furthermore, the fins 74 may extend to the outside of the casing through the windows 12. The heat in the housing 32 such as the heat generated by the windings is quickly absorbed by the annular heat absorbing section 72, and the heat is dissipated by the fins 74. Heat dissipation surface area of the heat dissipation device 70 is increased by the fins 74.

The heat dissipation device 70 of FIG. 4 is similar to the heat dissipation device 70 of FIG. 2 except that the end fins of each group of fins are shaped to fit into a curve end potion of the windows to improve the visual appeal of the power tool.

Figure 7:
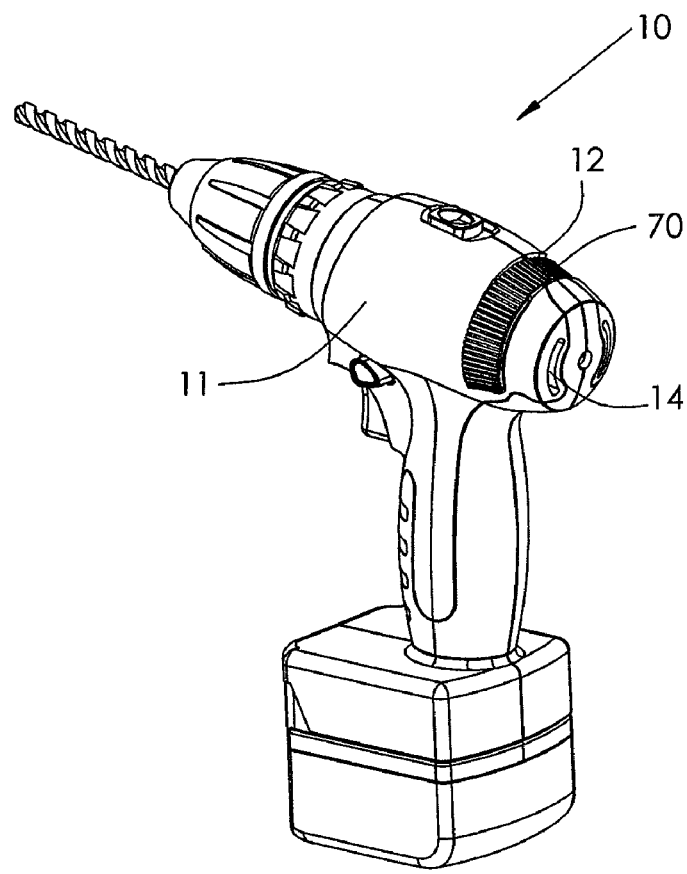
FIG. 7 illustrates a power tool according to another embodiment of the present invention.
Figure 8:
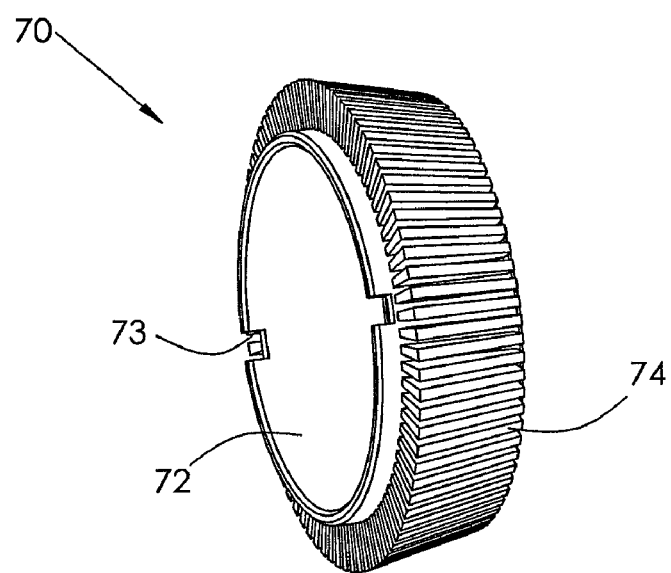
FIG. 8 illustrates a heat dissipation device according to another embodiment of the present invention.

Alternatively, as shown in FIGS. 7 and 8, fins 74 are arrayed on the whole outer surface of heat absorbing section 72. Casing 11 of the power drill comprises a part annular window 12 to expose the fins 74. Preferably, the fins 74 extend to the outside of the casing through the window 12.

When the drill is operated, the heat generated by windings is transferred to the motor housing 32 by heat conduction or heat radiation. Heat absorbed from the motor housing by the annular heat absorbing section 72 is dissipated by the fins 74. The heat dissipation surface of the heat dissipation device 70 is increased by the fins 74.

Referring to FIGS. 9 to 11, preferably the drill comprises a fan driven by the motor 30 or any other driving source. In this embodiment, the fan 50 is a centrifugal fan fixed to the rotor or shaft 36 of motor 30. A portion of each fin 74 extends axially passed the heat absorbing section 72 and is located radially outside of fan 50. That is, the outlet of the fan 50 is surrounded by the extending portions of the fins 74. The fins 74 are spaced from each other to form airflow passages there between and the fins 74 are arrayed near or in the windows 12 of the casing 11. Air flow generated by the fan 50 flows into the interior of the casing 11 through an inlet 14 formed in the casing 11, and then flows into the inlet of the fan 50 through a passage formed inside or outside of the motor 30. The air flow then flows to the fins 74 and exits the casing 11 along the airflow passages formed between fins 74 thus cooling the motor.

As mentioned, the fan can be fixed to the output shaft of the motor directly or indirectly. Alternatively, the fan may be installed independently from the motor 30 and driven by another driving source.

In the description and claims of the present application, each of the verbs "comprise", "include", "contain" and "have", and variations thereof, are used in an inclusive sense, to specify the presence of the stated item but not to exclude the presence of additional items.

Although the invention has been described with reference to one or more preferred embodiments, it should be appreciated by those skilled in the art that various modifications are possible. Therefore, the scope of the invention is to be determined by reference to the claims that follow.

The invention claimed is:

1. A power tool comprising a casing and a motor assembly installed in the casing,
    the motor assembly comprising a motor and a heat dissipation device,
    the motor comprising a housing and magnets or windings disposed at an inner surface of the housing,
    wherein the heat dissipation device comprises a heat absorbing section that is fixed to the outer surface of the housing and a plurality of fins extending from the heat absorbing section, and a window is formed in the casing to expose the heat dissipation device, the fins extend to the outside of the casing through the window.

2. The power tool of claim 1, wherein the heat absorbing section is ring-shaped and is fitted around and in contact with a radially outer surface of the housing.

3. The power tool of claim 2, wherein the fins are disposed along a part of a radially outer surface of the ring-shaped heat absorbing section, and two windows are formed in the casing to expose the fins.

4. The power tool of claim 2, wherein the fins are arranged along the whole of a radially outer surface of the ring-shaped heat absorbing section, and the window in the casing is part annular.

5. The power tool of claim 1, wherein the housing is a stator housing of the motor.

6. The power tool of claim 5, wherein the motor is a permanent magnet motor comprising permanent magnets made of a heat conductive material fixed to an inner surface of the housing, and heat generated by rotor windings is transferred to the magnets by way of heat radiation and transferred to the housing from the magnets by way of heat conduction.

7. The power tool of claim 5, wherein the motor is a brushless motor or universal motor, comprising field windings arranged inside the housing.

8. The power tool of claim 1, further comprising a fan and the casing comprises an air inlet, airflow generated by the fan entering into the casing through the air inlet and flowing out of the casing through the window where the fins are exposed.

9. The power tool of claim 8, wherein the fan is a centrifugal fan and an outlet of the fan is surrounded by portions of the fins that extend axially from the heat absorbing section.

10. A power tool comprising:
    a casing comprising a window and an air inlet;
    a motor assembly installed in the casing and comprising:
    a motor comprising a housing and magnets or windings disposed at an inner surface of the housing;
    a heat dissipation device comprising a heat absorbing section that is fixed to an outer surface of the housing and a plurality of fins extending from the heat absorbing section, the fins being exposed in the window; and
    a centrifugal fan comprising an outlet that is surrounded by portions of the fins that extend axially from the heat absorbing section, airflow generated by the fan entering into the casing through the air inlet and flowing out of the casing through the window where the fins are exposed.

* * * * *